United States Patent
Paeme et al.

(10) Patent No.: US 10,592,840 B2
(45) Date of Patent: Mar. 17, 2020

(54) METHOD FOR "REAL TIME" IN-LINE QUALITY AUDIT OF A DIGITAL OPHTHALMIC LENS MANUFACTURING PROCESS

(71) Applicant: Automation & Robotics S.A., Verviers (BE)

(72) Inventors: Sabine Paeme, Alleur (BE); Thomas Zangerle, Thimister-Clermont (BE); Christian Laurent, Verviers (BE)

(73) Assignee: Automation & Robotics S.A., Verviers (BE)

( * ) Notice: Subject to any disclaimer, the term of this patent is extended or adjusted under 35 U.S.C. 154(b) by 41 days.

(21) Appl. No.: 16/111,757

(22) Filed: Aug. 24, 2018

(65) Prior Publication Data
US 2018/0365620 A1 Dec. 20, 2018

Related U.S. Application Data

(63) Continuation-in-part of application No. PCT/EP2017/053945, filed on Feb. 21, 2017.

(30) Foreign Application Priority Data

Feb. 26, 2016 (EP) .................... 16157551
Jul. 5, 2016 (EP) .................... 16178015

(51) Int. Cl.
*G06Q 10/06* (2012.01)
*B29D 11/00* (2006.01)

(52) U.S. Cl.
CPC ....... *G06Q 10/06395* (2013.01); *B29D 11/00* (2013.01); *B29D 11/0098* (2013.01); *B29D 11/00951* (2013.01); *B29D 11/00961* (2013.01)

(58) Field of Classification Search
None
See application file for complete search history.

(56) References Cited

U.S. PATENT DOCUMENTS

2015/0178865 A1   6/2015   Anderson et al.

FOREIGN PATENT DOCUMENTS

| EP | 2 214 868 | 8/2010 |
| EP | 3 020 542 A1 | 5/2016 |
| WO | WO 2009/068613 A1 | 6/2009 |

OTHER PUBLICATIONS

Fogliatto, Flavio S., Da Silveira, Giovani J.C., and Borenstein, Denis. The mass customization decade: An updated review of the literature. Int. J. Production Economics, Elsevier, 2012, vol. 138, p. 14-25.

*Primary Examiner* — Mohammad Ali
*Assistant Examiner* — Saad M Kabir
(74) *Attorney, Agent, or Firm* — Reinhart Boerner Van Deuren P.C.

(57) ABSTRACT

The present invention relates to a method for providing a model assessing a quantitative expected global quality level of an ophtalmic lens, said lens having given lens and environment parameters, and being produced by a digital lens manufacturing process. A method for real-time in-line quality audit of the freeform production line is provided, by means of a process quality score, built as the result of the normalization of the computed global quality level based on the expected value of manufactured lenses obtained by normal production.

18 Claims, 8 Drawing Sheets

Lens Manufacturing Process Unit

= Quality of a digital lens manufacturing process unit

METHOD FOR "REAL TIME" IN-LINE QUALITY AUDIT OF A DIGITAL OPHTHALMIC LENS MANUFACTURING PROCESS

CROSS-REFERENCE TO RELATED PATENT APPLICATIONS

This patent application is a continuation-in-part of International Application No. PCT/EP2017/053945, filed Feb. 21, 2017, which claims priority to European Application No. 16157551.9, filed Feb. 26, 2016 and European Application No. 16178015.0, filed Jul. 5, 2016, the entire teachings and disclosure of which are incorporated herein by reference thereto.

FIELD OF THE INVENTION

The present invention relates to the field of digital manufacturing processes used for digital spectacle lens manufacturing in the prescription (Rx) lens production laboratories.

The invention relates particularly to providing an automatic method for a reactive (or "real time") and accurate audit of the manufacturing process. Such an audit should be based upon the analysis of the measurement results of an optical power mapping providing high resolution and upon accurate error map of optic power on the surface of lenses. This audit is applicable to products originating from normal production or routine production to be delivered.

The present invention also relates to a method applicable to lens single surface power measurements assessing the design replication of this single machined surface (reflection measurement, surface scan, etc.) of the lens, generally immobilized on a surfacing block, for auditing at least a limited part of the steps of the manufacturing process.

Finally the method is applicable to any manufacturing process used for spectacle lens manufacturing.

Prior Art and Problem to be Solved

The ophthalmic industry has evolved from a situation where fixed, rigid designs were once replicated (by molding, etc.) in series at the blank manufacturer's, via a well mastered mass-production process checked at a few points of a few samples to guarantee the design replication, up to digital surfacing which has completely changed the way of making lenses. Any individualized, customized design can now be directly surfaced on the lens (which is called "design replication") in the Rx lab.

This evolution has a number of consequences:
- the digital process is delicate and requires continuous maintenance
- the quality of the final product is expected to be higher but it is much more difficult to assess a variety of defect types appearing at any position on the surface, on individual designs (thus all different);
- the responsibility in the manufacturing of the progressive surface has been transferred from the blank manufacturer (i.e. from mass production) to the Rx lab.

The digital manufacturing process involves a sequence of steps, such as for instance, in the case of digital lens surfacing: blocking lens blank, generating lens surface (one or two), polishing lens surface, engraving reference marks on the lens surface, etc. leading to a great diversity of possible defects affecting the final lens quality.

External parameters, called environment parameters, outside the lens itself and outside the manufacturing process, play a role on process quality (for instance lab temperature, etc.)

Many lens parameters play a role on the resulting product quality in a process under control or not: material, (refraction) index, parameters of the lens "design", and more generally geometrical and optical parameters, etc. In the production laboratories, owing to huge product diversity, numerous relevant lens parameters may play an important role on lens quality during normal production.

Finally, some parameters related to the manufacturing process, but which are not related to the lens itself, play a role on the process quality (e.g. the tool speed, etc.).

Inspection machines are at the center of the lab quality management and are crucial to maintain at a high level the quality standard for every product that is shipped.

In many cases, inspection is performed by measuring the through power with a focometer on a limited number of points (one, two or three points for instance) defined by some standards, without assessing the design replication on the whole surface and the surface is checked only for strong defects by visual lens quality assessment using appropriate lighting for evidencing some surface defects but without any precise objective measurement (for ex: light projection through the lens and analysis of the image projected on a diffusing screen).

Among the available inspection solutions, through power mapping inspection is the more appropriate for the lab of RX glasses compared to other solutions. Thus mapping inspection using through power measurement has become essential in order to guarantee the quality of the freeform manufacturing process.

Often though, inspection machines based on power mapping are used to classify the measured lenses in a "binary" way between "good" and "bad" products, but corrective actions are taken only when the reject rate has reached a given threshold, often a long time after an issue occurred in the production process, leading to waste of time and money.

In many cases, the mapping technology is used to audit the lab as well. Once in a while, a defined set of lenses is produced and the measurement results are analysed by experts. Although these audits provide useful and objective data over the production quality and already lead to better decisions, they are very often out of time.

More frequent audits are based on the analysis of the evolution of one or more parameter(s) measured on a well selected master lens regularly produced by the lens manufacturing process for detecting drifts of the latter.

For example, document EP 2 214 868 A1 discloses a process for controlling a spectacle lens manufacturing process comprising the steps of: a) manufacturing a master lens according to a manufacturing process using a manufacturing device, b) measuring by using at least a measuring device at least one parameter of the master lens of step a), c) recording the value of the parameter, d) repeating regularly step a) to c) and checking the evolution of the parameter over time, wherein the evolution of at least one parameter of the manufacturing device used during the lens manufacturing process is checked over time and the evolution over time of at least one parameter of the master lens is related with the evolution over time of the at least one parameter of the manufacturing device.

This document associated with the principle of statistical process control (SPC) using graphical representations under the form of control charts with lower and upper limits for a measurable parameter and based on single measurements, allows for occasional inspection of the manufacturing process for given products and defects classes. This method is well-known of the person skilled in the art. Accordingly, mass production process may be well stopped for manufacturing over time intervals a master lens, i.e. a lens used as a learning sample, which design is well-known and controlled, and chosen together with a well-chosen measurement so that to be sensitive to the variations of the process parameter(s) one wants to trace or study. The aim thereof is to control the stability of the manufacturing process (parameter), from time to time, by comparison with predetermined tolerances and not to assess a resulting lens quality of every produced lens, in real time. There is no diversity of the master lens: all the produced lenses have exactly the same design. Only one, or a very limited number of measurements is carried out on each master lens, for example a point corresponding to near and/or far vision for example.

Regarding these limitations, the applicant is already providing on the market lens through power mapping inspection devices with the resolution and accuracy needed for evidencing the lens defects based on an error map. The latter is calculated as the difference between the measured through optical power map and the reference/theoretical through optical power map expected from a perfect lens (i.e. with a perfect design replication).

An automatic analysis of the error map is provided, giving quantitative results under the form of various design deviation criteria calculated on a defined zone of the lens area, making lens evaluation easier. Among those outputs, a lens global quality criterion, named Global Mapping Criterion (in short "GMC™", Automation & Robotics, Verviers, Belgium) takes into account all defect types and is valid for all lens/process/environment variants. This measurable/computable lens global quality criterion combines a weighted quantification of any defect due to the manufacturing process, and affecting the quality of the lens design replication (Note: in the following, for the sake of simplicity, "measurable/computable lens global quality criterion" will be replaced by "computable lens global quality criterion"). It has been adjusted to match at best a field expert evaluation. This quantification is based on the error map values of an appropriate and sufficiently large number of measurement points spread on the whole lens surface. In some way, it provides, automatically and with a high repeatability, a global quality evaluation of the design replication similar to the evaluation by the expert.

In summary, in prior art,
complex multistep process,
great lens diversity (see also [1]),
great defect diversity,
high influence of many lens and environment parameters on quality, inducing varying deviations for a process under control;
huge amount of data provided by the mapping inspection on the lenses from production, etc.,
make the automatic interpretation of the measured maps, in terms of manufacturing process quality, impossible to perform in an efficient way.

Aims of the Invention

The present invention utilizes error maps as measured by through or surface optical power mapping, providing information about defects related to most of the critical manufacturing steps of the digital lens manufacturing and as a result providing the advantage of assessing the quality of the final lens functionality (refraction of light).

An invention aim is to build an appropriate feedback on the process based on mapping inspection, thanks to an automatic use of the whole information contained in the error map.

Another aim of the invention is to provide a method for a reactive (ideally "real time") and accurate audit of a lens manufacturing process. Such an audit should be based upon the analysis of the measurement results of an accurate optical power mapping providing high resolution and accurate error map of the lens surface for lenses from normal production.

The invention also aims to provide an innovative quality audit of any manufacturing unit used to perform one of the manufacturing steps of the lenses, based on high end mapping inspection and smart data analysis solutions, intended to lead to higher quality, higher throughput and lower costs.

The method presented here is intended to be applicable to single surface power measurements assessing the design replication of a single surface (reflection measurement, surface scan, . . . ) of the lens (generally fixed on the surfacing block), for auditing a limited part of the steps, or every step, of the manufacturing process.

SUMMARY OF THE INVENTION

The present invention is described in more details in the claims hereinafter.

According to one embodiment, a method for real-time quality auditing of a digital lens manufacturing process of ophthalmic lenses is disclosed, applicable to each ophthalmic lens produced, said lens having given lens and environment parameters, said method involving the following computer-implemented steps of:

setting up a computable single lens global quality criterion (or LGQC), providing a quality quantification for every manufactured lens of a first selected representative learning set of measured lenses produced by the manufacturing process, so that the computation result is a computed LGQC, wherein the single LGQC of a lens is a unique transformation between said lens and a unique value, based on a deviations or error map of an appropriate and sufficiently large selected number of measurement points spread on the whole lens surface, said deviations map being built as the difference at each point between the measured map of actual respective through or surface optical power and the corresponding theoretical/reference map of respective through or surface optical power; said measured map of actual respective through or surface optical power being corrected by a correction being performed according to the knowledge of the expected systematic deviations due to one or more manufacturing process steps which are independently controlled and evaluated;

learning a mathematical model and optimizing the same, based on a second selected representative learning set of measured lenses having given lens and environment parameters and produced by the manufacturing process as model input, the model output being an expected lens global quality criterion, or expected LGQC, which is defined as the LGQC of ophthalmic lenses produced using the manufacturing process in a given, generally stable and fixed manufacturing process state under control, and minimizing the difference between the model output for said expected LGQC and the computed LGQC based on said second selected learning set, said model learning and optimization including the identification, based on said second selected learning set, of relevant input lens and environment parameters playing a role on the lens quality during normal production, so that the LGQC model output will be based on a set of parameters gathered within these relevant input lens and environment parameters, said model being able to provide an expected LGQC for each lens further produced in normal production according to its lens and environment parameters, the latter being the input of the model;

providing a first quality score, called "process quality score" for the digital lens manufacturing process, said process quality score being calculated from measurements on a single manufactured lens or on a limited number of manufactured lenses obtained by normal production, and being independent of lens and environment variants, said method further involving the following steps:

evaluating the computed LGQC for every lens processed;

selecting a number X of lenses, taking into account the time period allocated for the evaluation and/or statistical considerations regarding the signal-to-noise ratio (SNR) limit;

quantifying the "process quality score" on the basis of an average of the normalization of the actual computed LGQC for any manufactured lens with its lens and environment parameters, said normalization being based on a comparison with the expected LGQC for said manufactured lens with its lens and environment parameters, and the expected lens global quality criterion for a given, generally stable and fixed manufacturing process state under control;

using the process quality score as a quality feedback of the manufacturing process.

According to one embodiment, a method for providing a "unit quality score", for any digital manufacturing process unit of a manufacturing step to be evaluated, called "evaluated unit", is disclosed, said unit quality score being calculated from measurements on a limited number of manufactured lenses obtained by normal production, independent of lens and environment variants, and independent of the control state of the other units involved in the manufacturing process.

The disclosure also relates to a non-transitory computer-readable medium storing a program including instructions that, when executed by a processor, causes the processor to perform the steps of the method for quality auditing of a digital manufacturing process of ophtalmic lenses, in real time, according to the above.

DETAILED DESCRIPTION OF PREFERRED EMBODIMENTS

Figure 1:
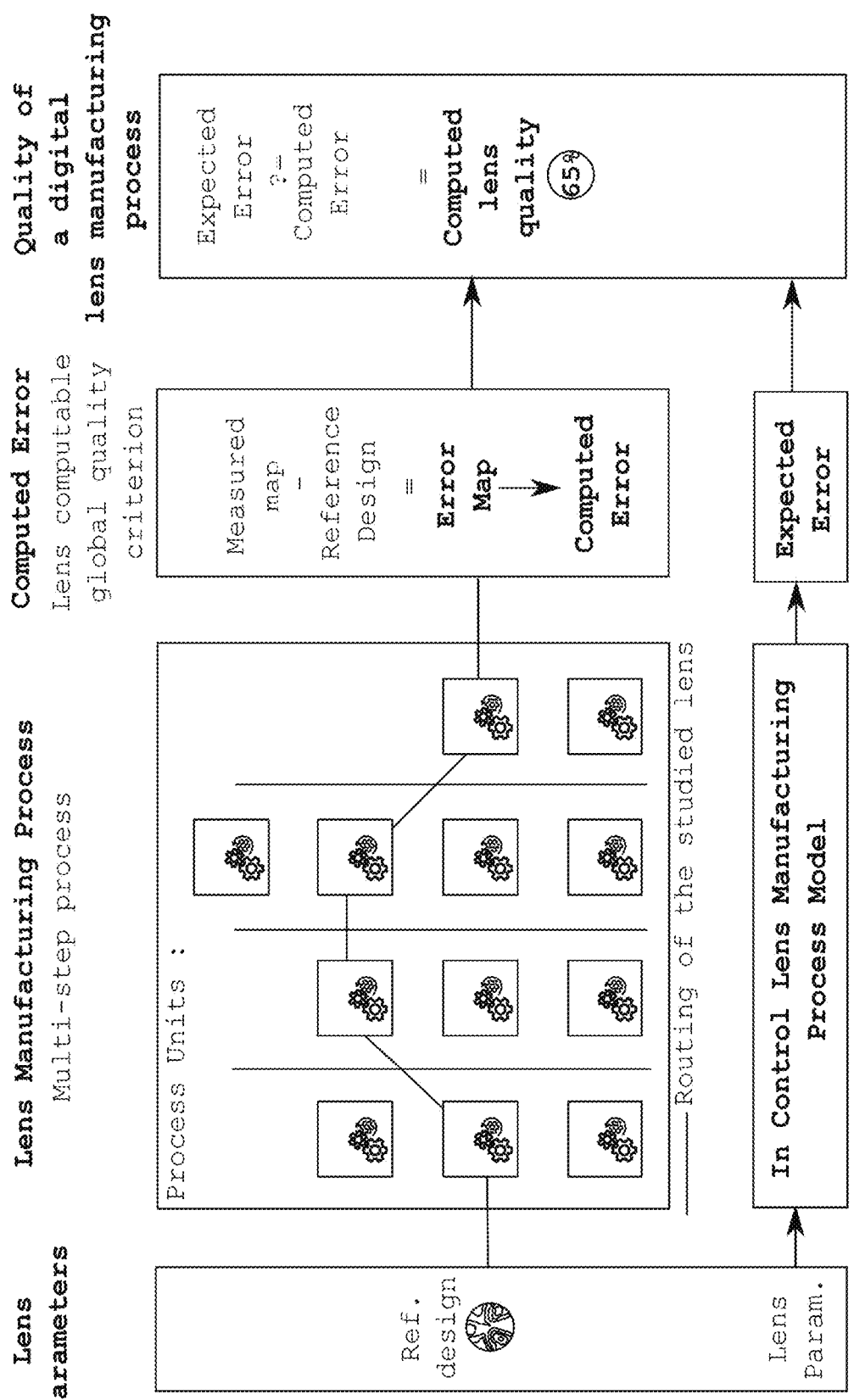
FIG. 1 schematically represents the overall scheme of the method according to the present invention, defining the quality of a digital lens manufacturing process (quality of lens design replication).

For the sake of clarity we give hereinafter a number of definitions, which are an integral part of the present disclosure.

Definitions

Lens or digital lens (often named free form lens): an optical lens, generally intended for ophthalmic spectacles, often customized, with at least one digitally defined surface to be processed using a digital manufacturing process.

Quality of a lens (hereinafter, operational definition for easy understanding): ability of a set of intrinsic characteristics of a lens to satisfy its final function, namely light refraction. Practically, all the considerations regarding "quality" may be applied to the corresponding "error amplitude" associated with the defects that are measured (quality of design replication).

Digital lens manufacturing process: a process using one or more computer-driven means able to produce smooth lens surface(s), defined digitally and which are possibly complex. Various successive means may be implemented including means for performing the step of material removal (surfacing one-side, two-sides) from a blank and/or of digital additive 3D manufacturing, etc. A selected part of the lens multistep manufacturing process is considered in this disclosure, as including one or more machines or tools or operations (see [1]).

Multi-steps manufacturing process: a sequence of process steps, such as, for digital lens surfacing: blocking the lens blank, generating the lens surface, polishing the lens surface, engraving reference marks on the lens surface, etc.

Well-adjusted or under control manufacturing process: in SPC, any manufacturing process which is stable, i.e. which does not trigger control chart "detection rules" (such as Western Electric rules).

Digital (lens) manufacturing process unit: the smallest manufacturing sub-process subject to selection in routing operations during lens manufacturing. In extreme cases, it can be either a tool used on a machine or a complete line of machines.

Real time: a time scale definition in which indicators are updated as soon as the inspection results of a new manufactured lens are available.

Normal or routine production: as opposed to manufacturing of specific testing lenses, a normal production designates routine daily production of the prescription laboratory.

Lens parameters: set of parameters specifying/defining a lens to be manufactured and playing a role on the resulting quality of said lens when it is actually manufactured for a process under control:material index, (refraction), parameters of the lens "design", and more generally geometrical and optical parameters, etc. In the production laboratories, due to huge product diversity, numerous lens parameters play an important role on the lens quality during the normal or routine production.

Environment parameters: parameters, which are external with respect to the lens itself and to the manufacturing process, but which play a role on process quality (for ex. lab temperature, etc.).

Relevant parameters: whether they be lens, environment or manufacturing process parameters, relevant parameters are naming the parameters actually influencing the final quality of manufactured lenses in a given manufacturing process.

Appropriate learning set: a large scale learning set of measured lenses, i.e. a great number of lenses ideally having characteristics or parameters as diversified or variable as in actual production, needed to provide information on the effect of all the relevant variants from the space of the lens and environment parameters playing a role on the lens quality during normal production.

Representative learning set: a large scale learning set of measured lenses produced by the manufacturing process having all lens defect variants.

Learning method: the whole set of (machine) learning methods, whether they are supervised or not (e.g. principal component analysis (PCA), linear/non-linear multivariate regression, etc.), allowing to perform the steps of influence factors selection and to model relationships between the influence parameters and the output to be modelled.

Error map: difference between the measured optical through or surface power map and the reference/theoretical (or target) optical through or surface power map expected from a perfect lens (i.e. with a perfect design replication). For the purpose of the present invention, the lens error map is obtained for a plurality of points, preferably an appropriate and sufficiently large number of points (e.g. 1000 points) suitably spread over the whole surface of a lens.

Error pattern: characteristic pattern qualifying the general contouring of an error map, based on the spatial distribution of the error.

Figure 2:
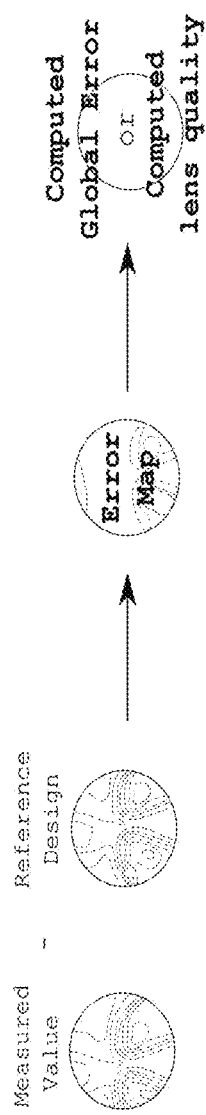
FIG. 2 schematically represents the concept of computable lens global quality criterion (e.g. GMC), computed from the quantification of the global error of the design replication.

Lens global quality criterion (see FIG. 2): computable_parameter providing a single value representative of the quality of a manufactured lens, characteristic of the error pattern signature of the lens, taking into account the concerned defect types and valid for all lens/environment/process parameter variants (see [1]).

In other words, the lens global quality criterion is a parameter providing a single value resulting from a one-to-one transformation of a specific lens error map information at an appropriate and sufficiently large number of points. This is a criterion of quantification which is global, unique and absolute, in the sense it does not depend on the specific manufacturing tool or on other process and environment parameters. As mentioned above, this criterion is very generally defined to match or to mimic, automatically and with high repeatability, the evaluation that would be obtained from an expert. In particular, since the purpose of setting up a single quality criterion is to provide a tool for imitating the evaluation of the expert, it is appropriate to define this unique criterion of quality on the basis of a set of lenses having sufficient size to sweep all or most of the defects encountered during manufacturing. Mathematically speaking, according to one embodiment, it is built from local power errors measured in the error map but it may also involve for example likelihood-defined mathematical measurements on the appropriate and sufficiently large number of considered points. An example of lens global quality criterion is GMC™.

The computable lens global quality criterion combines a weighted quantification for any defect due to the manufacturing process, and affecting the lens quality level using admitted rules or directly evaluated by the expert in the field. This quantification is based on the deviations, compared to the theoretical/reference values, of the measured actual optical power of an appropriate and sufficiently large number of measurement points spread on the lens surface.

Normalization of a value based on a reference: arithmetic quantification of the distance between the 'value' and the 'reference' in a given space. Here, a normalization is applied to a measured error (using the measured error as the 'value') to get a comparison with the expected error (the expected error becomes the 'reference'). So, a unique mathematical transformation of the measure value is used to make it comparable with the reference value (linear normalization, . . . ). Another formulation for "normalization" could be comparison (with) or difference or ratio, etc.

Expected systematic deviations: deviations between theoretical lens and actually produced lens due to a particular and controlled step of the manufacturing process, which can be independently evaluated. For example, a uniform power shift of a semi-finished product can be measured before machining. This measurement will allow to correct the final evaluation of the machining process quality (i.e. for not taking into account the semi-finished product error) from the lens error measurement (which takes into account the semi-finished error).

Quality of a digital lens manufacturing process: a digital lens manufacturing process quality score, independent of lens and environment variants, obtained by the normalization of the measured lens global quality criterion (ex. GMC) on any lens produced, based on the expected specific lens global quality criterion calculated for the same lens being manufactured in the situation of well adjusted (or in/under control) process using a model taking into account the parameters from the relevant parameter space (lens and environment variants). Practically, a mathematical expectation (average, weighted or not) value on a limited set of lenses can be calculated for limiting statistical fluctuations. To be rigorous, this definition applies either to a homogeneous set of manufacturing units (same manufacturing units for every manufacturing step), or to a given routing (defined as a sequence of manufacturing steps), or to a homogeneous set of routings, or, in case of a non-homogeneous set of manufacturing units, it may apply to a fixed representative set of routings.

Average: a mathematical expectation (average, weighted or not)

Quality of a digital lens manufacturing process unit: a digital lens manufacturing process unit quality score, independent of lens and environment variants, obtained by the normalization of the measured lens global quality criterion (ex. GMC) on any lens produced, with a manufacturing process in/under control (except for the unit to be evaluated) involving the unit to be evaluated, based on the expected specific lens global quality criterion calculated for the same lens being manufactured in case of well adjusted (or in/under control) process by a model taking into account the parameters from the relevant parameter space (lens and environment variants). Practically, a mathematical expectation (average, weighted or not) value on a limited set of lenses can be calculated for limiting statistical fluctuations.

Appropriate number of measurement points of the lens (on lens surface): number of points selected to have an optimal measurement resolution with a spatial distribution of sampling on the lens surface, taking into account the Shannon theorem applied to the spatial frequency of the power deviations on the surface linked with the defects to be detected. This number of points is for example comprised between 100 and 100000 for the typical defects generated in the freeform lens manufacturing process.

Manufacturing process or manufacturing process unit in/under control: manufacturing process or manufacturing process unit well adjusted, in the general meaning of statistical process control (SPC).

Control state (of a manufacturing process or of a manufacturing process unit): indicator that tells if the process is well adjusted or not, in the general meaning of statistical process control (SPC).

FIG. 1 shows the overall scheme of the method according to the present invention, for assessing the quality of a digital lens manufacturing process: definition of lens and environment parameters leading to all possible lens and environment (variable) variants characterized by a reference design elaboration of an "in control" lens manufacturing process model leading to an expected error definition of a multi-step manufacturing process (an example of a single routing is shown on FIG. 1) leading to a measured error, which is the difference between the measured design and the reference design, then computed under the form of a lens computable global quality criterion, and finally an objective/unbiased, quantitative and absolute evaluation of the global quality of the given digital lens manufacturing process by a comparison of the computed error and the expected error, i.e. by the normalization of the computed error based on the expected error, as defined beforehand.

This global process quality evaluation brings a feedback to the lab management and in case of tool failure (drift, dropout, etc.), suitable actions can be undertaken.

The detailed steps of the method, as well as a number of applications thereof, are disclosed hereinafter.

Lens Global Quality Criterion Model

Figure 3:
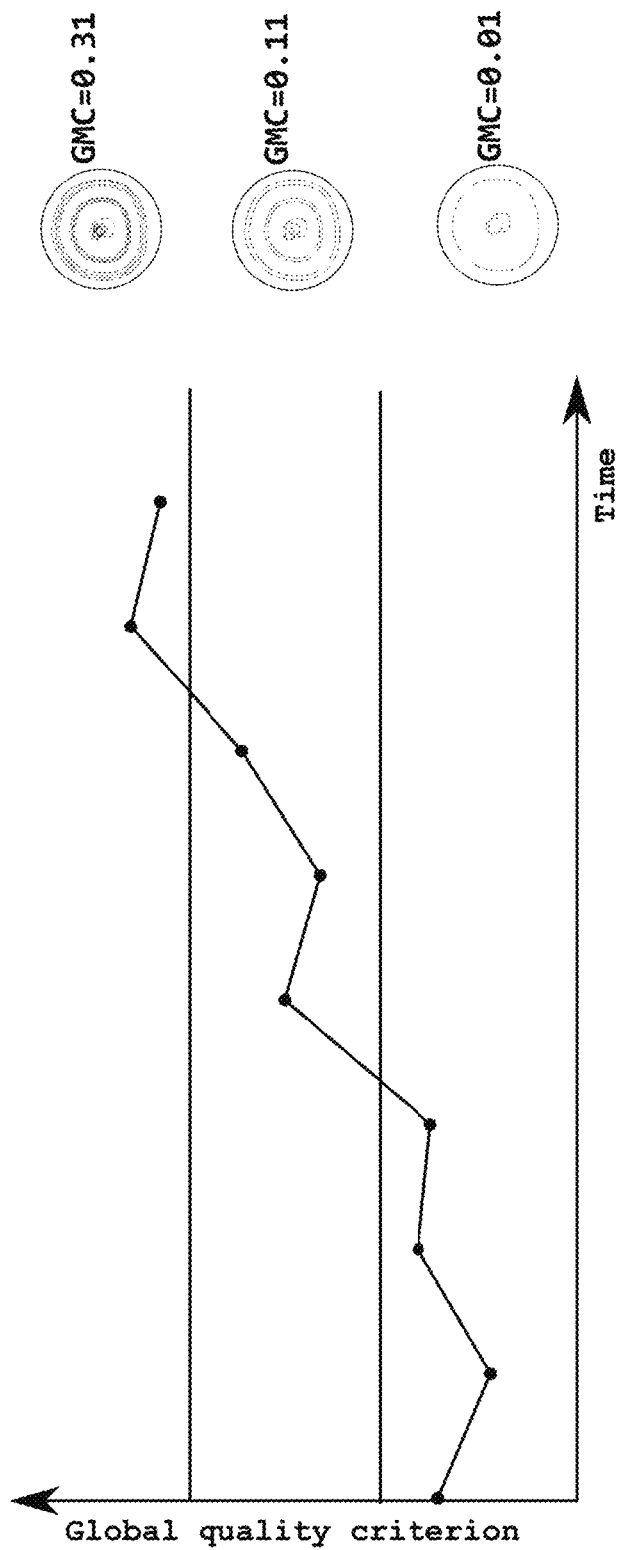
FIG. 3 represents the increase of the GMC parameter value as the importance of the defect (here ring defect) gets higher.

According to some embodiments of the invention, a method for providing a model assessing the expected global quality level of an ophthalmic lens is disclosed, said lens having given lens and environment parameters, and being produced by a digital lens manufacturing process, said method involving the following computer-implemented steps of:
  setting up, based on a first selected representative learning set of measured lenses produced by the manufacturing process, a single computable lens global quality criterion providing a quality quantification for every manufactured lens based on the deviations map, compared to a map of theoretical/reference values, of the measured actual respective through or surface optical power, said measured map of respective actual respective through or surface optical power being corrected by a correction performed according to the knowledge of the expected systematic deviations due to one or more manufacturing process steps which are independently controlled and evaluated, said error maps respectively corresponding to the evaluation of said deviations in an appropriate and sufficiently large selected number of measurement or theoretical/reference points spread on the lens surface. In a tangible way, the global quality quantification value itself is advantageously built on the basis of a weighted combination of statistical values (e.g. mean, standard deviation) and/or global decomposition coefficients (e.g. coefficients of a deviation map model under the form of Zernike polynomials, Fourier decomposition, etc.) evaluated on the deviations map between the reference/theoretical optical through or surface power and the actual optical through or surface power, an/or on any mathematical transform of this error map (e.g. using derivatives of any order). The Global Mapping Criterion (or GMC, see above) developed by the applicant as a qualitative/quantitative error criterion is considered as a lens global quality criterion. GMC is a single number representing the global quality of design replication based on the error map. It works on any error pattern, independently of the kind and location of defect. As illustrated in FIG. 3 for a ring pattern error, the value of the GMC increases when the importance of the defect gets higher. GMC, which is a reactive and significant value, based on powerful mapping inspection results, is chosen to create a feedback signal on the process.

obtaining, by a learning method, a mathematical model and optimizing the same, based on a second selected appropriate learning set of measured lenses, said mathematical model providing a transformation between said every manufactured lens with its lens and environment parameters, and an expected lens global quality criterion of ophthalmic lenses produced using the manufacturing process for a given, generally stable and fixed manufacturing process state under control, and minimizing the (one) difference between the expected model output for said lens global quality criterion and the computed value of the lens global quality criterion based on said second selected appropriate learning set of measured lenses, said learning method including the identification, based on said second selected appropriate learning set of measured lenses, of input relevant lens and environment parameters playing a role on the lens quality during normal production, so that the lens global quality criterion output is based on a set of parameters gathered within these relevant input lens and environment parameters.

The first intention of the invention is to set up a model based on the lens global quality criterion (such as the GMC of the applicant).

The model reproduces or mimics the behavior of the manufacturing "tool". The model has to be adjusted by minimizing the deviations to cope with said tool.

When the tool/process is under control, it should provide an actual error evaluated by the lens global quality criterion which is close to the expected error given by the model.

Process Quality Score

According to some embodiments, the method is further providing a first quality score, called "process quality score" for a digital lens manufacturing process, said quality score being calculated from measurements on a single manufactured lens or on a limited number of manufactured lenses obtained by normal production, and being independent of lens and environment variants, said method further involving the following steps:
  digitally evaluating the computable lens global quality criterion for every lens processed;
  selecting a number X of lenses needed for the evaluation of a digital lens manufacturing process quality score independent of lens and environment variants, taking into account the time period allocated for the evaluation and/or statistical considerations regarding the influence of the signal-to-noise ratio (SNR) limit on the "process quality score";

quantifying the "process quality score" based on the average of a normalization of the actual value of the computable lens global quality criterion of any lens produced, said normalization being based on (or referenced to) the expected lens global quality criterion given by said mathematical model providing the transformation between said lens with its environment parameters, and the lens global quality criterion for a given, generally stable and fixed manufacturing process state under control.

The model transforms the data corresponding to a given lens in a given environment into an "expected" GMC.

The process quality score is quantified by averaging the difference (or ratio) between actually measured GMC for a manufactured lens and the "expected" GMC.

The analysis of real production data shows that the design replication quality, and the expected GMC, depend on many lens parameters, as a lens which is difficult to manufacture is more likely to have a high replication error and thus a high GMC.

Among others, those parameters are the addition, the decentration, the material, and the back curvature. For example, the higher the addition, the higher the difficulty of performing a lens with usual machining and the higher the expected GMC values. Thus, an accurate and reactive process feedback providing a quality quantification of the manufacturing process has to be made insensitive to lens parameters. Hence, instead of directly using the GMC values, one should use the normalized value of the computed GMC based on the expected GMC if the process is stable and in control. This expected value is provided by a model of the process in control, calculated on real measurement data from the lab.

Therefore, for a process stable and in control, the production of a batch of the same lens many times leads to the same GMC output, it is a case of mass-production. However, freeform lens production is a one-of-kind industry rather than a batch production. Therefore, even if the process is stable and in control, at a given quality level, this process will produce lenses with different GMC, depending on the difficulty to produce the lens.

Figure 4:
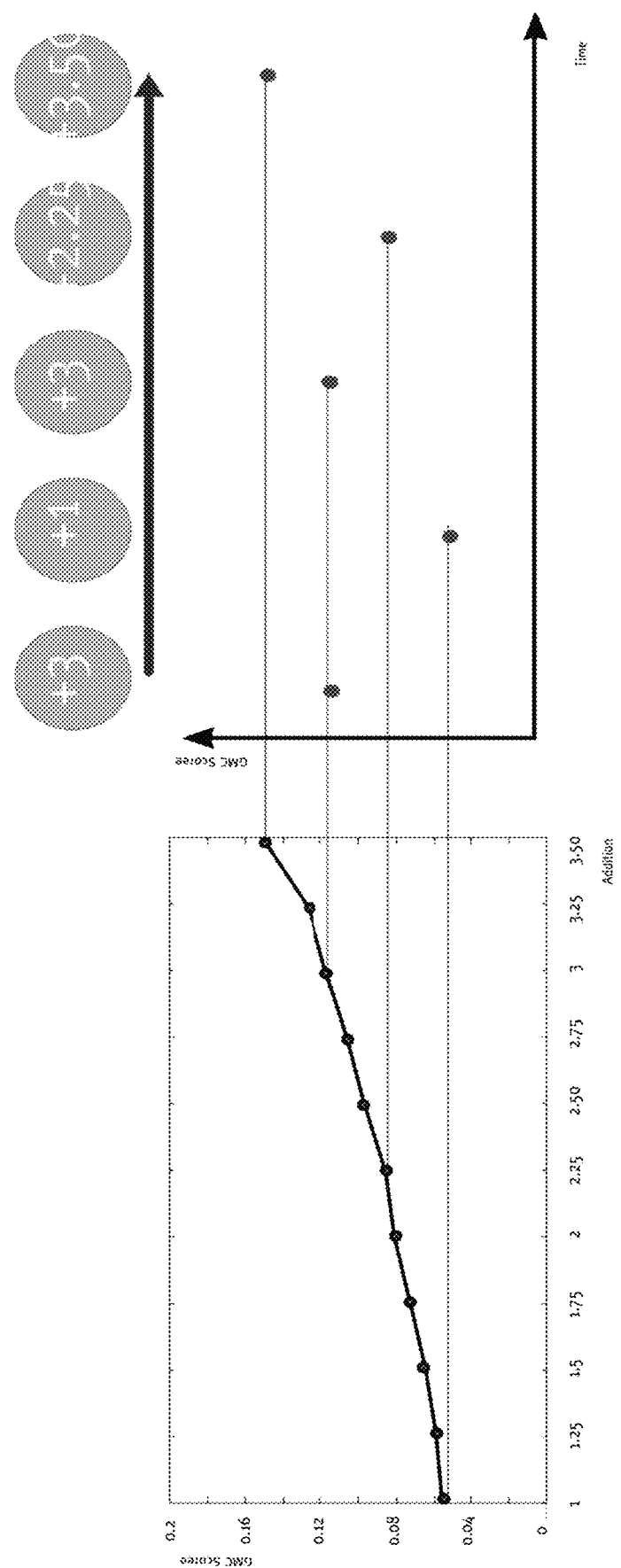
FIG. 4 represents the case of stable in control process producing similar lenses with different additions, the corresponding monitoring of the GMC being an unstable signal, due to its sensitivity to lens parameters, in this case the addition only.

FIG. 4 presents a case of stable and in control process producing similar lenses but whose only variable parameter is addition. The corresponding monitoring of the GMC provides an unstable signal, due to its high sensitivity to lens parameters, with characterize the intrinsic difficulty to produce each lens. Hence, the GMC signal value is not stable for a process in control at a given quality level, the GMC value corresponds more to the quality of the product than to the quality of the process.

The quality score of the process which is looked for has to be stable for a process which is stable and in control even if the studied lens is less or more difficult to be manufactured.

Therefore, in order to build an appropriate process feedback signal based on the GMC, one has to make it insensitive to the lens parameters. Hence, according to the present invention, instead of using the GMC signal itself, the inventors used either the difference or ratio between the GMC and the one expected for the process supposed in control. This way, if the GMC is equal to the one expected in control, the process is still considered in control. But if the GMC is higher than the expected GMC in control, it means that the process goes out of control.

To calculate the predicted GMC, which is the expected value of the GMC for the process in control, a model of the process in control has to be built. This model has to include the relationship between the lens parameters and the corresponding expected GMC, for example, in the case illustrated in FIG. 4, the relationship between addition and GMC.

A model calculated using a non-linear multivariate regression leads to good results. The normalization of the process quality score as defined above, based on the GMC value, which is a product quality score, has been evidenced for a particular generator (not shown). As expected, as these values are independent of lens parameters, the signal quantifying the manufacturing process quality is less noisy and more stable than the signal directly built on the GMC of the manufactured lenses.

The process quality score is therefore a significant and reactive signal to be used for a feedback of the process.

A comparison has been made for the following three feedback signals: reject rate score, power deviation based score at the two ISO inspection points and process quality score based on GMC (not shown). In the example, the studied time period ended with a maintenance step performed in the lab due to an increase in the number of rejected lenses. The signals based on the reject rate and on the power analysis show an increase at the end of the time period, which correspond to an increase of the number of rejected lenses. However the third signal shows a constant growth during the time period. This increase is the sign of a drift of the generator. Hence, if the lab would have monitored this last value instead of the GMC, they could have performed preventive action on the generator, avoiding an increase of the rejected lenses number.

The process quality score is given for each lens, and provides results similar to the quality feedback of a mass production process although here each lens is different.

Unit (or Machine) Quality Score

According to some embodiments, the method is further providing a second quality score, called "unit quality score", for any digital lens manufacturing process unit to be evaluated, called "evaluated unit", calculated from the process evaluation performed on a limited number of manufactured lenses obtained by normal production, and independent of lens and environment variants, said method further involving the following steps:

recording, for any digital lens manufacturing unit, the "process quality score" for every lens processed;

selecting a number Y of lenses needed for the evaluation of the manufacturing unit to be evaluated, or "evaluated unit", taking into account the time period allocated for the evaluation and/or statistical considerations regarding the influence of signal-to-noise ratio (SNR) limit on the "unit quality score";

calculating the "unit quality score" of the "evaluated unit", as the averaged "process quality score" relative to all the Y lenses processed on the "evaluated unit".

Figure 5A:
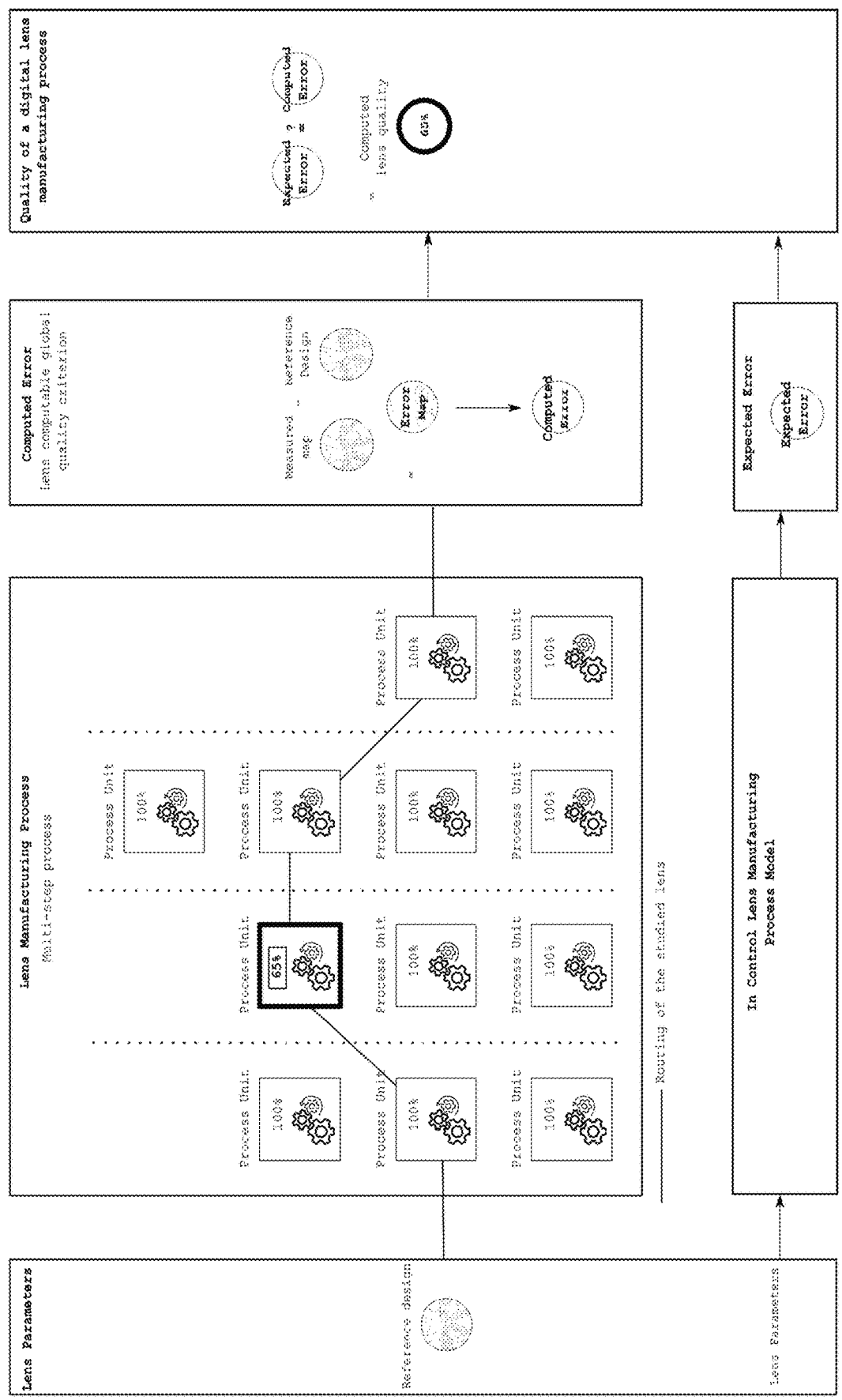
FIG. 5A and FIG. 5B schematically represent the definition of the lens manufacturing process unit quality.
Figure 5B:
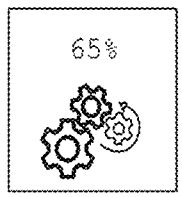

The lens manufacturing process unit quality definition is given in FIG. 5A and FIG. 5B. The unit quality score is quantified by taking, on the basis of a number of measured lenses having been processed on the evaluated unit, the deviations with respect to GMC, determining an average process quality score only taking into account lenses selectively processed on a particular unit. These data can be used to provide real time machine quality indicators to the lab manager in case of mixed production (lab not organized in lines).

Figure 6:
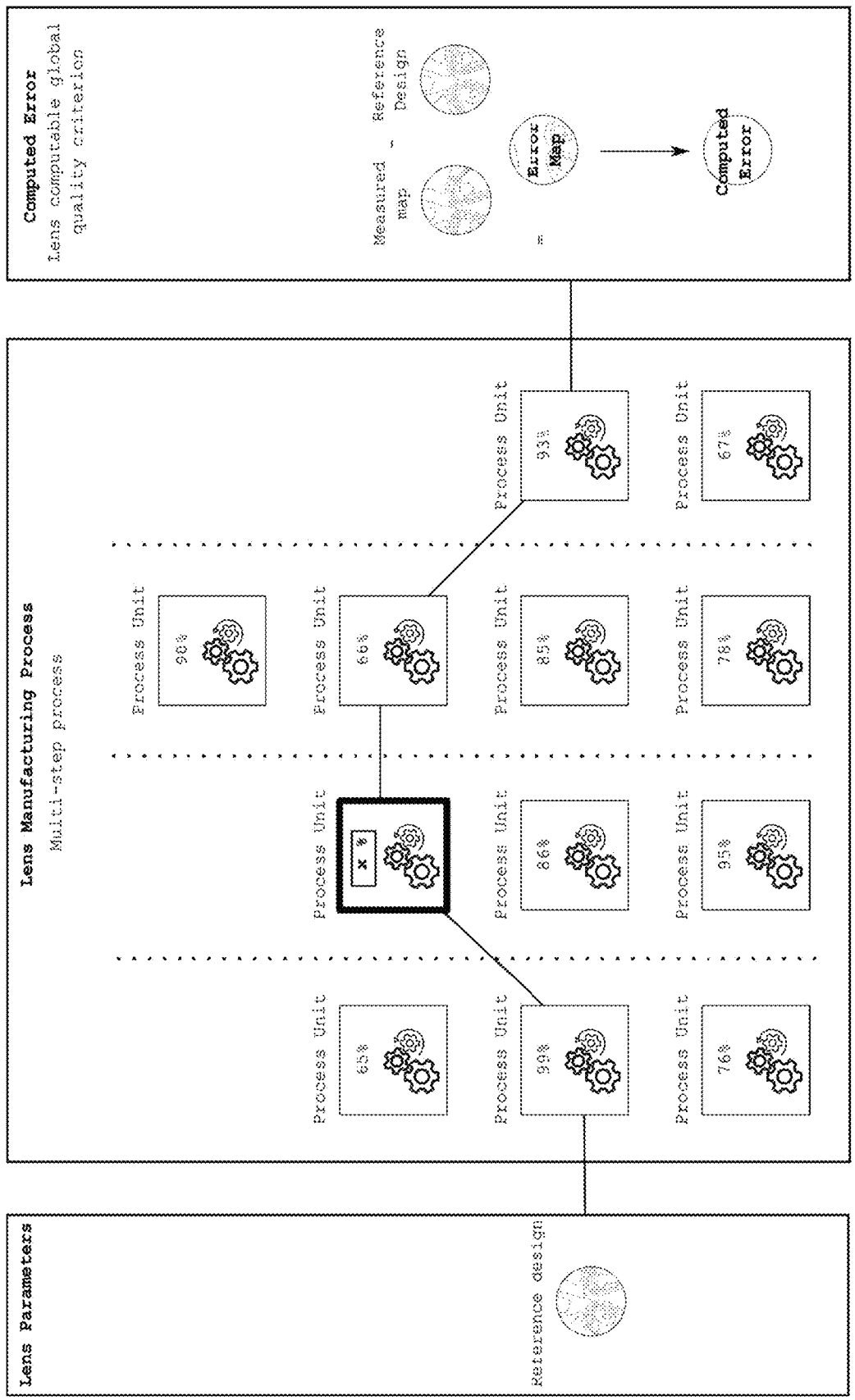
FIG. 6 shows the evaluation of a given lens manufacturing unit quality for a defined lens routing.

The process quality scores may be linked with the production routing data to provide a real-time feedback on the manufacturing process units. Production routing data gather at least the list of machines used to produce a given lens and the entry and exit times of the various corresponding manufacturing units (FIG. 6).

Improved Unit (or Machine) Quality Score (all Existing Lens Routings with this Unit)

Considering, in a multi-step process, the inspection data of all the lenses that were run through the same polisher, for example, will be influenced by the performance of next and previous machines in the production routing chain, such as a generator.

According to some embodiments, the method is further providing a third quality score, called "improved unit quality score", for any digital lens manufacturing process unit to be evaluated, called "evaluated unit", calculated from measurements on a limited number of manufactured lenses obtained by normal production, independent of lens and environment variants, and independent of the control state of the other units involved in the manufacturing process, further involving the following steps:
  recording, for every digital lens manufacturing unit, the "process quality score" for every lens processed;
  determining all the ophthalmic lens manufacturing units linked by a lens routing, called "units linked to the evaluated unit" or "linked units";
  selecting a set of lenses Y' processed on the "evaluated unit" and/or on the "linked units", said set being needed for the evaluation of the "evaluated unit", taking into account the time period allocated for the evaluation and/or statistical considerations regarding the influence of signal-to-noise ratio (SNR) limit on the "improved unit quality score";
  while taking into account the set of "process quality scores" for the corresponding selected set of lenses and all the corresponding routings, determining mathematically the most probable "improved unit quality score" of every unit(s) from the evaluated and linked units.

According to these embodiments, one takes into account the other units on which the lens has been processed. The aim is to eliminate the effect of a possible failing linked unit. Here a statistical analysis is provided.

Figure 7:
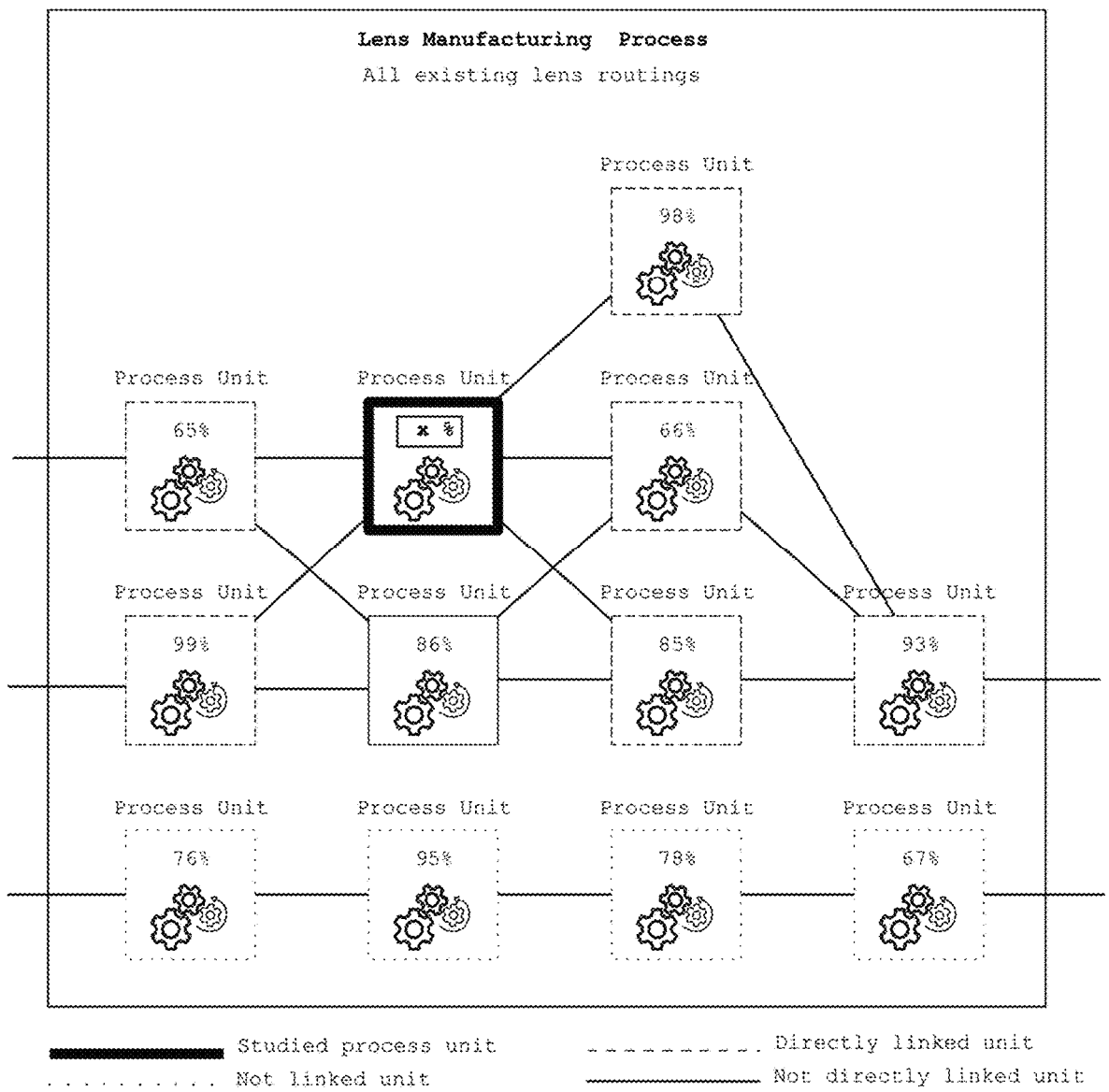
FIG. 7 shows all existing lens routings (linked units, directly linked, not directly linked and not linked units) to a given process unit.

The units linked to the evaluated unit can be the units linked directly or not from steps before (resp. after) the evaluated unit or from the manufacturing step concerned by the valuated unit, but not linked directly thereto (see FIG. 7).

Application—Process Parameters Adjustment

According to some embodiments, the base method can be used for performing an adjustment of the process parameters, by means of the monitoring of the quantification of the expected global quality level of a lens, with any lens and environment parameters, to be produced by a digital lens manufacturing process with said adjustment of the process parameters.

Figure 8:
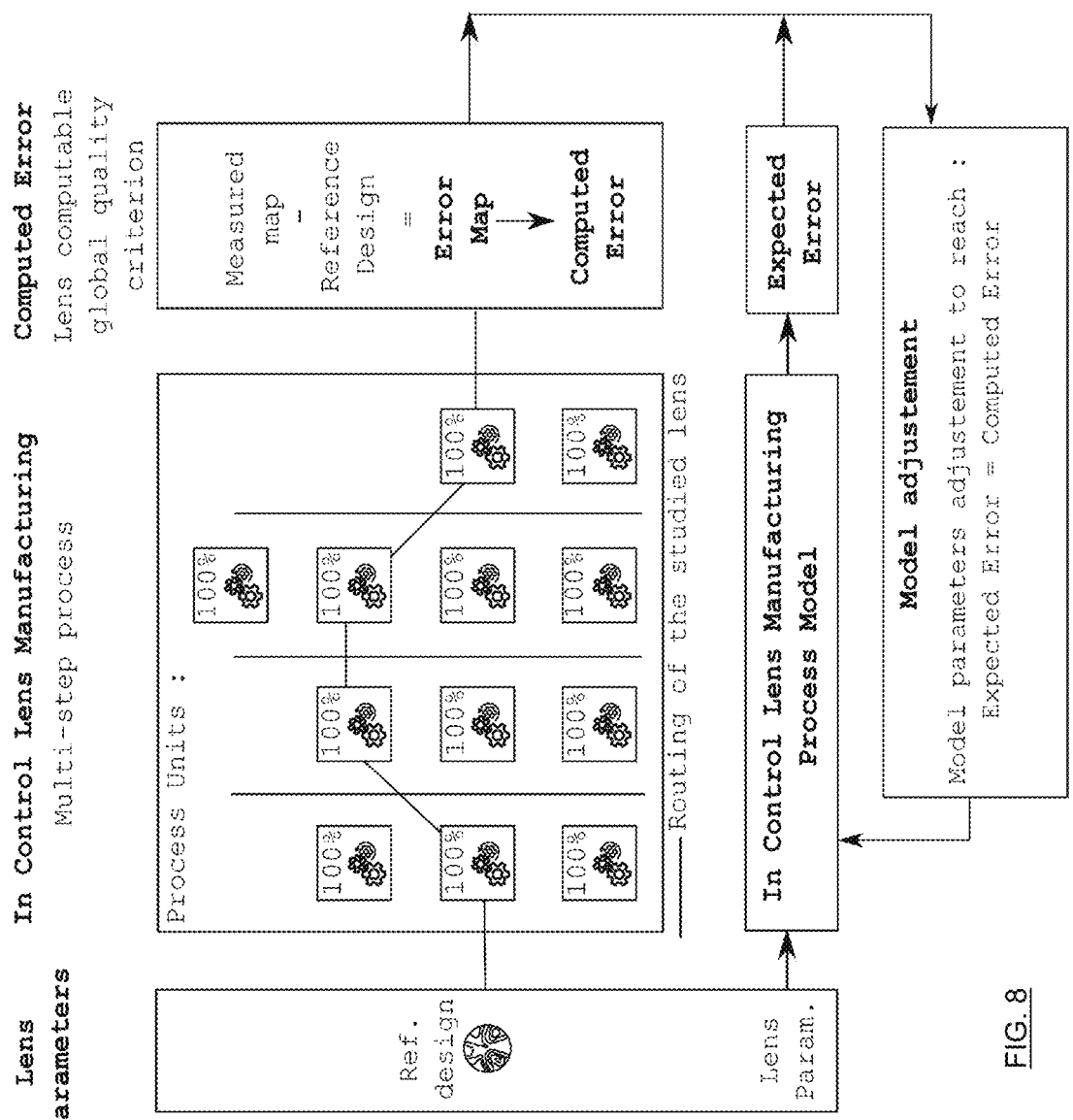
FIG. 8 shows the general configuration of the method of the invention where the in control lens manufacturing process model is adjusted.

According to these embodiments, the manufacturing process or environment parameters are modified. The model is adjusted to take into account lens, manufacturing process and/or lens environment parameters which are modified (see FIG. 8).

According to some embodiments, an adjustment of the process parameters is performed, leading to a quantification of the quality score of a digital ophthalmic lens manufacturing process or "process quality score", with said adjustment of the manufacturing process parameters.

According to some embodiments, an adjustment of the process parameters is performed, leading to a quantification of the quality score of any digital ophthalmic lens manufacturing process unit, or "unit quality score", with said adjustments of the manufacturing process parameters.

According to some embodiments, an adjustment of the evaluated unit parameters is performed, leading to a quantification of the quality score of any digital ophthalmic lens manufacturing process unit, or "unit quality score", with said adjustment of the manufacturing unit parameters.

Other Applications

According to some embodiments, the method has an additional step of providing a display, for selected lenses and given environment parameters, possibly reduced to a 1D, 2D, etc. parameter space, of the error between the actual global quality criterion of the measured lenses of the learning set and the expected global quality criterion of said lenses as provided by the model, giving a means for detecting possible dropout of the manufacturing process under control, for specific conditions regarding some values of lens or environment parameters, for example some area of the parameter space.

The display can be provided under the form of a dashboard representing for example a production machine quality score at a certain time (not shown). Each machine of the lab can be represented for example with an error bar for each one. The machine quality score impacts can be represented with a color (for ex. green: Ok; yellow, red: not Ok), while the length of the bar can represent the amount of lenses that was run through the machine.

It is also possible to get a continuous production quality audit to control how the machines perform during a longer period of time. The time evolution of the machine quality score for several generators can be monitored during a certain period. In the example case discussed, it may turn out that a generator emphasized, creates a higher error during the whole studied time period. A look at the error maps can then confirm a systematic error and this generator may be confirmed to be the one that produces the highest amount of rejects in this studied lab (not shown).

Machine quality scores can also be used to detect a drift and to know when maintenance is required. Then a supervision software could detect this drift and show a warning to alert the lab manager and suggest action.

Flow management is often used to manage and optimize the production flow in terms of quantity. Combining this approach with the information provided by the machine quality score, it is now also possible to manage the production flow in terms of quality.

For example, if it is seen on the dashboard that a first engraver performs well but is less used, a second engraver is not used while a third engraver, which is mostly used, produces more errors, a smart supervision software could decide to send the lenses through the two other engravers, at least up to the problem fixing (not shown).

According to some embodiments, the method has an additional step of providing an automatic detection of the dropout of the manufacturing process under control, for specific conditions regarding some values of lens or environment parameters, for example some area of the parameter space.

According to some embodiments, the method has an additional step providing an automatic detection of the dropout of the manufacturing process possibly out of control, for specific conditions regarding some values of lens or environment parameters, for example some area of the parameter space.

Bibliography

FOGLIATTO, Flavio S., D A SILVEIRA, Giovani J. C., and BORENSTEIN, Denis. The mass customization decade: An updated review of the literature. *Int. J. Production Economics*, Elsevier, 2012, vol. 138, no 1, p. 14-25.

The invention claimed is:

1. A method for quality auditing of a digital manufacturing process of ophthalmic lenses in real time, applicable to each ophthalmic lens produced, said lens having given lens and environment parameters, said method involving the following computer-implemented steps of:
    setting up a computable single lens global quality criterion (or LGQC), providing a quality quantification for every manufactured lens of a first selected representative learning set of measured lenses produced by the manufacturing process, so that the computation result is a computed LGQC able to match or to mimic, automatically and with high repeatability, a quality evaluation that would be obtained from an expert, wherein the single LGQC of a lens is a unique transformation between said lens and a unique value, based on a deviations or error map of an appropriate and sufficiently large selected number of measurement points spread on the whole lens surface, said deviations map being built as the difference at each point between the measured map of actual respective through or surface optical power and the corresponding theoretical or reference map of respective through or surface optical power; said measured map of actual respective through or surface optical power being corrected by a correction performed according to the knowledge of the expected systematic deviations due to one or more manufacturing process steps which are independently controlled and evaluated;
    learning a mathematical model and optimizing the same, based on a second selected representative learning set of measured lenses having given lens and environment parameters and produced by the manufacturing process as model input, the model output being an expected lens global quality criterion, or expected LGQC, which is defined as the LGQC of ophthalmic lenses produced using the manufacturing process in a given, generally stable and fixed manufacturing process state under control, and minimizing the difference between the model output for said expected LGQC and the computed LGQC based on said second selected learning set, said model learning and optimization including the identification, based on said second selected learning set, of relevant input lens and environment parameters playing a role on the lens quality during normal production, so that the LGQC model output will be based on a set of parameters gathered within these relevant input lens and environment parameters, said model being able to provide an expected LGQC for each lens further produced in normal production according to its lens and environment parameters, the latter being the input of the model;
    providing a first quality score, called process quality score for the digital lens manufacturing process, said process quality score being calculated from measurements on a single manufactured lens or on a limited number of manufactured lenses obtained by normal production, and being independent of lens and environment variants, said method further involving the following steps:
    evaluating the computed LGQC for every lens processed;
    selecting a number X of lenses, taking into account the time period allocated for at least one of the evaluation and statistical considerations regarding the signal-to-noise ratio (SNR) limit;
    quantifying the process quality score on the basis of an average of the normalization of the actual computed LGQC for any manufactured lens with its lens and environment parameters, said normalization being based on a comparison with the expected LGQC for said manufactured lens with its lens and environment parameters, and the expected lens global quality criterion for a given, generally stable and fixed manufacturing process state under control;
    using the process quality score as a quality feedback of the manufacturing process.

2. The method according to claim 1, wherein the appropriate and sufficiently large selected number of measurement points spread on the lens surface is determined on the basis of the Shannon theorem, taking into account a maximal spatial frequency of the power deviations and is comprised between 100 and 100000.

3. The method according to claim 1, wherein the learning method of the mathematical model is an automatic learning method, supervised or not, comprising a linear or non-linear multivariate regression or a principal component analysis method (PCA).

4. The method according to claim 1, further providing a second quality score in real time, called unit quality score, for any digital lens manufacturing process unit to be evaluated, called "evaluated unit", said unit quality score being calculated from measurements on a limited number of manufactured lenses obtained by normal production, and independent of lens and environment variants, said method further involving the following steps:
    recording, for any digital lens manufacturing unit, the "process quality score" for every lens processed;
    selecting a number Y of lenses needed for the evaluation of the manufacturing unit to be evaluated, or "evaluated unit", taking into account the time period allocated for at least one of the evaluation and statistical considerations regarding the signal-to-noise ratio (SNR) limit;
    calculating the unit quality score of the evaluated unit as an averaged process quality score relative to all the Y lenses processed on the evaluated unit.

5. The method according to claim 1, for providing a third quality score in real time, called improved unit quality score, for any digital lens manufacturing process unit to be evaluated, called evaluated unit, said improved unit quality score being calculated from measurements on a limited number of manufactured lenses obtained by normal production, independent of lens and environment variants, and independent of the control state of the other units involved in the manufacturing process, said method further involving the following steps:
    recording, for every digital lens manufacturing unit, the process quality score for every lens processed;

determining all the lens manufacturing units linked by a lens production routing, called units linked to the evaluated unit or linked units;

selecting a set of lenses Y' processed on at least one of the evaluated unit and the linked units, said set being needed for the evaluation of the evaluated unit, taking into account the time period allocated for at least one of the evaluation and statistical considerations regarding the signal-to-noise ratio (SNR) limit;

while taking into account the set of process quality scores for the corresponding selected set of lenses Y' and all the corresponding routings, mathematically determining the most probable improved unit quality score of every unit from the evaluated and linked units.

6. The method according to claim 1, wherein an adjustment of the manufacturing process parameters is performed, leading to a quantification of the expected global quality level given by the mathematical model for a lens, having given lens and environment parameters, to be produced by a digital lens manufacturing process with said adjustment of the manufacturing process parameters.

7. The method according to claim 1, wherein it has an additional step of providing a display, for selected lenses and environment parameters, possibly reduced to a 1D or 2D or 3D parameter space, of the error between the actual LGQC of the measured lenses of the first learning set and the expected LGQC of the lenses as provided by the model, giving a means for detecting dropout of the manufacturing process under control, for specific conditions regarding some values of at least one of lens and environment parameters.

8. The method according to claim 1, wherein it has an additional step of providing a display, for selected lenses and environment parameters, possibly reduced to a 1D or 2D or 3D parameter space, of the error between the actual LGQC of measured lenses from the production and the expected LGQC of the lenses as provided by the model, giving a means for detecting dropout of the manufacturing process possibly out of control, for specific conditions regarding some values of at least one of lens and environment parameters.

9. The method according to claim 7, wherein it has an additional step of providing an automatic detection of the dropout of the manufacturing process under control, for specific conditions regarding some values of at least one of lens and environment parameters.

10. The method according to claim 8, wherein it has an additional step providing an automatic detection of the dropout of the manufacturing process possibly out of control, for specific conditions regarding some values of at least one of lens and environment parameters.

11. The method according to claim 1, wherein adjustment of the manufacturing process parameters is performed, leading to a quantification of the quality score of the digital ophthalmic lens manufacturing process or process quality score, with said adjustment of the manufacturing process parameters.

12. The method according to claim 4, wherein an adjustment of the manufacturing process parameters is performed, leading to a quantification of the quality score of the digital ophthalmic lens manufacturing process unit, or unit quality score, with said adjustments of the manufacturing process parameters.

13. The method according to claim 4, wherein an adjustment of the evaluated unit parameters is performed, leading to a quantification of the quality score of any digital ophthalmic lens manufacturing process unit, or unit quality score, with said adjustment of the unit parameters.

14. The method according to claim 1, wherein the normalization of the actual computed LGQC for any lens produced corresponds to the difference or ratio between said actual computed value of the LGQC and said expected value of the LGQC.

15. A non-transitory computer-readable medium storing a program including instructions that, when executed by a processor, causes the processor to perform the steps of a method for quality auditing of a digital manufacturing process of ophthalmic lenses, in real time, applicable to each ophthalmic lens produced, said lens having given lens and environment parameters, said method involving the following computer-implemented steps of:

setting up a computable single lens global quality criterion (or LGQC), providing a quality quantification for every manufactured lens of a first selected representative learning set of measured lenses produced by the manufacturing process, so that the computation result is a computed LGQC able to match or to mimic, automatically and with high repeatability, a quality evaluation that would be obtained from an expert, wherein the single LGQC of a lens is a unique transformation between said lens and a unique value, based on a deviations or error map of an appropriate and sufficiently large selected number of measurement points spread on the whole lens surface, said deviations map being built as the difference at each point between the measured map of actual respective through or surface optical power and the corresponding theoretical or reference map of respective through or surface optical power; said measured map of actual respective through or surface optical power being corrected by a correction performed according to the knowledge of the expected systematic deviations due to one or more manufacturing process steps which are independently controlled and evaluated;

learning a mathematical model and optimizing the same, based on a second selected representative learning set of measured lenses having given lens and environment parameters and produced by the manufacturing process as model input, the model output being an expected lens global quality criterion, or expected LGQC, which is defined as the LGQC of ophthalmic lenses produced using the manufacturing process in a given, generally stable and fixed manufacturing process state under control, and minimizing the difference between the model output for said expected LGQC and the computed LGQC based on said second selected learning set, said model learning and optimization including the identification, based on said second selected learning set, of relevant input lens and environment parameters playing a role on the lens quality during normal production, so that the LGQC model output will be based on a set of parameters gathered within these relevant input lens and environment parameters, said model being able to provide an expected LGQC for each lens further produced in normal production according to its lens and environment parameters, the latter being the input of the model;

providing a first quality score, called process quality score for the digital lens manufacturing process, said process quality score being calculated from measurements on a single manufactured lens or on a limited number of manufactured lenses obtained by normal production, and being independent of lens and environment variants, said method further involving the following steps:

evaluating the computed LGQC for every lens processed;

selecting a number X of lenses, taking into account the time period allocated for at least one of the evaluation and statistical considerations regarding the signal-to-noise ratio (SNR) limit;

quantifying the process quality score on the basis of an average of the normalization of the actual computed LGQC for any manufactured lens with its lens and environment parameters, said normalization being based on a comparison with the expected LGQC for said manufactured lens with its lens and environment parameters, and the expected lens global quality criterion for a given, generally stable and fixed manufacturing process state under control;

using the process quality score as a quality feedback of the manufacturing process.

16. The method according to claim 5, wherein an adjustment of the manufacturing process parameters is performed, leading to a quantification of the quality score of the digital ophthalmic lens manufacturing process unit, or unit quality score, with said adjustments of the manufacturing process parameters.

17. The method according to claim 5, wherein an adjustment of the evaluated unit parameters is performed, leading to a quantification of the quality score of any digital ophthalmic lens manufacturing process unit, or "unit quality score", with said adjustment of the unit parameters.

18. The method according to claim 1, wherein the appropriate and sufficiently large selected number of measurement points spread on the lens surface is determined on the basis of the Shannon theorem, taking into account a maximal spatial frequency of the power deviations and is comprised between 1000 and 100000.

* * * * *